United States Patent [19]

Skruhak et al.

[11] Patent Number: 5,410,725
[45] Date of Patent: Apr. 25, 1995

[54] DATA PROCESSOR WITH MICROCODE MEMORY COMPRESSION

[75] Inventors: Robert J. Skruhak; James C. Nash; Kuppuswamy Raghunathan, all of Austin, Tex.

[73] Assignee: Motorola, Inc., Schaumburg, Ill.

[21] Appl. No.: 37,744

[22] Filed: Mar. 26, 1993

Related U.S. Application Data

[63] Continuation of Ser. No. 460,211, Jan. 2, 1990, abandoned.

[51] Int. Cl.[6] ............................................. G06F 9/22
[52] U.S. Cl. .................... 395/800; 364/244.6; 364/DIG. 1
[58] Field of Search ............ 395/775, 800, 375; 364/244.6, DIG. 1

[56] References Cited

U.S. PATENT DOCUMENTS

| | | | |
|---|---|---|---|
| 4,307,495 | 12/1981 | Tredennick et al. | 364/DIG. 1 |
| 4,554,627 | 11/1985 | Holland et al. | 395/375 |
| 4,573,118 | 2/1986 | Pamouny et al. | 364/DIG. 1 |
| 4,755,962 | 7/1988 | Mor | 364/760 |
| 4,812,971 | 3/1989 | Butts, Jr. et al. | 364/DIG. 1 |
| 5,046,040 | 9/1991 | Miyoshi | 395/375 |
| 5,053,954 | 10/1991 | Miyoshi | 364/DIG. 1 |

Primary Examiner—Alyssa H. Bowler
Assistant Examiner—John Harrity
Attorney, Agent, or Firm—Jonathan P. Meyer

[57] ABSTRACT

A data processor has a microcode memory which is reduced in size by sharing word locations having the same contents. When one of the shared word locations is addressed, a control signal is generated and coupled to a select circuit. The select circuit outputs a predetermined operand in place of the contents of the addressed shared word location which can contain a "do not care" operand value. Selective sharing or combining of the word locations is utilized when structuring the memory to optimize savings in circuit area.

3 Claims, 2 Drawing Sheets

DATA PROCESSOR WITH MICROCODE MEMORY COMPRESSION

This application is a continuation of prior application Ser. No. 460,211, filed on Jan. 2, 1990, now abandoned.

FIELD OF THE INVENTION

This invention relates to microprocessors with microcoded microsequencers and more specifically to minimizing size requirements of the microstore.

BACKGROUND OF THE INVENTION

A typical data processor has a microsequencer and an execution unit. Within the execution unit various dam operations are performed. The execution unit typically comprises an arithmetic unit, registers, communication buses, and a shifter. The microsequencer is usually either 'hardwired', i.e. designed using combinatorial logic gates, or 'microcoded', i.e. designed using a programmable memory. A microcode designed microsequencer has the advantage that the microsequencer architecture is more simple and straightforward than a hardwired design, and the microsequences can be easily modified by reprogramming the memory. Microcode thus becomes a collection of microprogram routines which implement the user-visible, macroinstruction set of the data processor. In a microcode design the memory is referred to as the microstore, and is often implemented as read only memory (ROM), or as read/write, random access memory (RAM).

There are generally two classes of information contained in a typical microprogram control store ROM word. The first class is actual control information, which controls such things as an arithmetic logic unit (ALU), a Shifter, and register transfer operations; the second class of information in a microprogram control store is commonly referred to as Next Micro Address (NMA) information. NMA information is usually an address which specifies the next access into the control store ROM. Therefore, when a microinstruction is fetched from the control store, the control information is used to control the ALU, Shifter, register transfers, etc., and the NMA information tells the microsequencer where to get the next microinstruction.

In U.S. Pat. No. 4,307,445 by Tredennick et al. entitled "Microprogrammed Control Apparatus Having A Two-Level Control Store For Data Processor" and assigned to the assignee herein, a dual ROM control store structure is described in which one ROM contains control information and a second ROM contains NMA information. Both ROMs have their own address decoders and these decoders are configured in such a way so as to "share" a single control ROM word with multiple NMA ROM words.

Referring to FIG. 1, a known split level microstore 10 for use in a data processor is shown. An NMA-ROM 17 and a control ROM 18 are illustrated wherein each ROM contains three words. NMA-ROM 17 contains words 11, 12 and 13 having address contents respectively labeled addresses "B", "C" and "A". Control ROM 18 contains words 14, 15 and 16 having control operand contents respectively labeled "X", "X" and "Y". A Next MicroAddress (NMA) is connected to each of a control ROM address decoder 19 and an NMA-ROM address decoder 20. Address decoder 20 is connected to each of words 11, 12 and 13, and respectively provides addresses labeled A', B' and C'. Address decoder 19 is connected to each of words 14, 15 and 16, and also respectively provides addresses A', B' and C'. In the illustrated form, address A' is formed as a portion of the address contents A. Similarly, address B' is formed from a portion of address contents B and address C' is formed from a portion of address contents C.

When address A' is issued by each of decoders 19 and 20, each of ROMs 17 and 18 is respectively accessed at words 11 and 14. In response thereto, control information labeled 'X' is outputted by control ROM 18. A next microaddress (NMA) labeled B' is derived by using the contents of word 11 of NMA-ROM 17 when addressed by address A'. Information stored within control ROM 18 essentially controls the registers, ALU, etc. of a data processor according to the bit pattern of the control information X and causes the next microinstruction at address B' to be retrieved. When the next microinstruction is fetched from each of words 12 and 15 by using address B', the microinstruction also is used to control the registers, ALU, etc. of the data processor according to the bit pattern of the control information X. A next microaddress (NMA) labeled C' is derived by using the contents labeled C of word 12 of NMA-ROM 17 when addressed by address B'. When the next microinstruction is fetched from each of words 13 and 16 by using address C', the microinstruction also is used to control the register, ALU, etc. of the data processor according to a bit pattern of control information labeled "Y". The NMA-ROM 17 contains within word 13 an address A' which is the address of the next microinstruction to be executed. Note that there are two control ROM words, words 14 and 15, which contain the bit pattern of the control information X.

Shown in FIG. 2 is split level microstore 10' which is a known modification of split level microstore 10 of FIG. 1 wherein words 14 and 15 are combined into one word and respond to either address A' or address B'. For convenience of comparison, comparable elements of FIG. 2 are numbered the same as in FIG. 1. In the modified form, a control ROM 18' has only two words, words 21 and 22. Decoder 19 is connected to words 21 and 22 wherein either address A' or address B' may address the contents of word 21 which is control information X. Address C' addresses the contents of word 22 which is control information Y.

By combining words 14 and 15 of FIG. 1, control ROM 18' of microstore 10' is reduced in size substantially by one-third. Using this scheme, the control information for addresses A' and B' is still the bit pattern of control information X. Also, the NMA information for each of addresses A', B' and C' is still unique. Word 21 of control ROM 18' is addressed along with either word 11 or word 12 of NMA ROM 17.

There are two important system conditions which must exist to allow the illustrated sharing to exist. First, two or more words in control ROM 18' have to contain identical contents; and second, the addresses for those words which are identical have to be assigned such that an address decoder can easily respond to multiple addresses. For example, if two identical control words are assigned the binary addresses $1000_2$ and $1001_2$, the words may be collapsed into one word whose address decoder is $100X_2$ ('X' indicates a 'do not care' condition, where either a 1 or 0 will match). Therefore, the address decoder for this location only needs to decode the three upper bits.

An added complication is the fact that address restrictions may apply to various word placements due to circuit implementation size and speed tradeoffs. For example, when implementing a conditional microbranch, it is often beneficial to restrict both branch paths' addresses such that they differ by only a specific bit(s) as opposed to fully specifying both addresses. An important fact is that it is desirable to have as many control words appear identical as possible because address restrictions might preclude many of the control words from being combine shared. In other words, addresses may not readily be assignable in a manner so that two control words can be shared. Therefore, it is typically required to have more than two control words with identical contents so that alternate address assignments can be made.

SUMMARY OF THE INVENTION

Accordingly, it is an object of the present invention to provide a data processor with improved ROM microcoding.

Another object of the present invention is to provide an improved method of reducing ROM size in a data processor.

In carrying out the above and other objects of the present invention, there is provided, in one form, a data processor with microcode memory compression. In one form, a first memory is connected to an address bus for receiving a predetermined address identifying one of a plurality of storage locations in the first memory. The first memory is organized into a plurality of field sections, each field section storing control information for implementing a predetermined control function. At least one of the field sections utilizes a same location for implementing any of multiple predetermined control functions. A second memory is connected to the address bus for also receiving the predetermined address. The predetermined address identifies one of a plurality of storage locations where an address to be used by the data processor is stored. The second memory further comprises a field which when addressed causes a control signal to be outputted by the second memory. A selector is connected to the first and second memory for receiving the control information from the first memory and the control signal from the second memory. The selector outputs one of either the control information or a predetermined control operand for use by the data processor in response to the control signal.

These and other objects, features, and advantages, will be more clearly understood from the following detailed description taken in conjunction with the accompanying drawings.

DETAILED DESCRIPTION OF THE INVENTION

Figure 1:
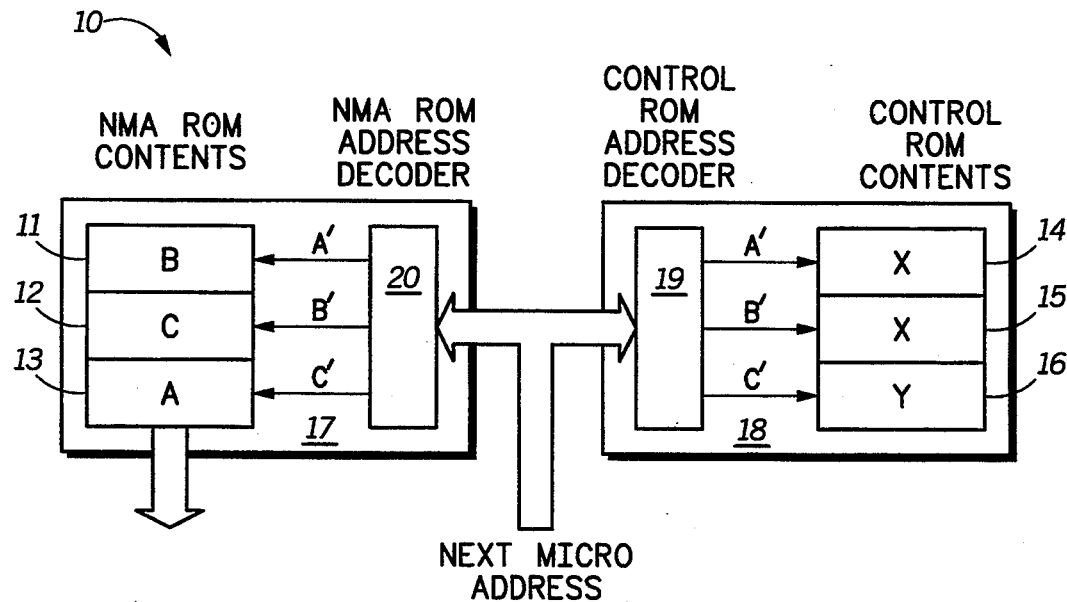
FIG. 1 is a block diagram of a known split level microstore in a data processor.
Figure 2:
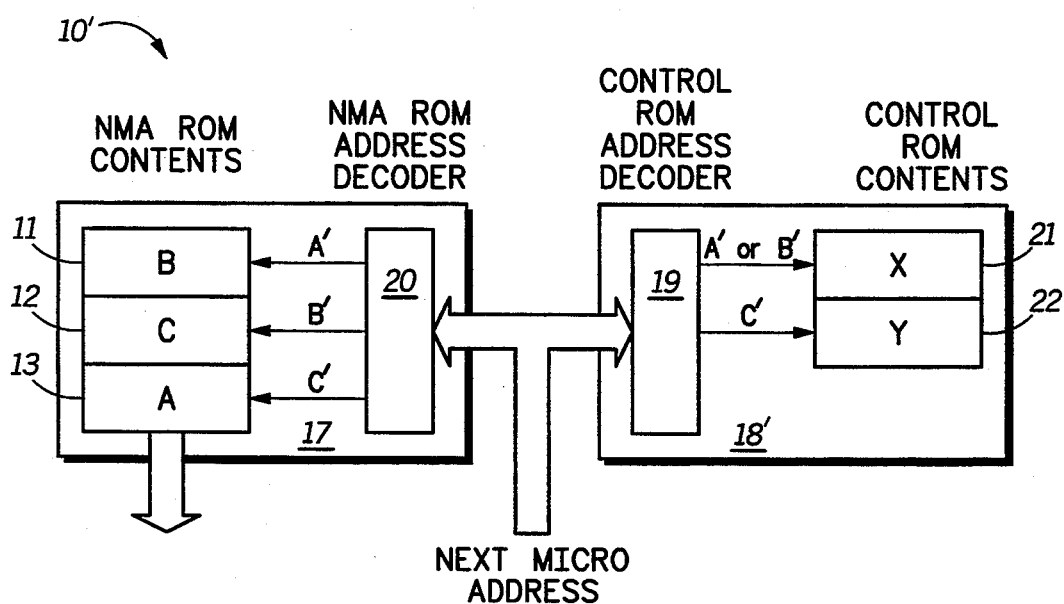
FIG. 2 is a block diagram of a known split level microstore with a sharing function.

The present invention increases the number of control words which have identical control information in a microstore of a data processor. To do this, the control information represented by the control words can be divided within a control ROM into several fields, each field controlling a different set of resources within a microcontroller or execution unit. For example, one field of several bits can control an ALU of a data processor, another field can control a shifter, another field can control a set of registers which gate on or off of an internal bus, etc. After all or most of the microcode has been written, an analysis may be made to determine the most commonly used bit patterns for each of the fields. We have discovered that for any given field, certain bit patterns are frequently used. An example of a representative analysis is shown in Table One. This example shows that for a fifteen-bit field that controls a shifter(not shown), a bit pattern of all zeros occurs in approximately one-third of the control words prior to sharing. Another bit pattern $0300_{hex}$ (hexidecimal) occurs in approximately twenty-two percent of the control words prior to any sharing of control word contents in a control ROM. A similar analysis is made in Table One for all of the bits in a control ROM which can be logically grouped into fields.

TABLE 1

| Shifter Control Field Bit Pattern Frequency |
|---|
| $0000_{hex}$ - 126 out of 478 (34%) |
| $0300_{hex}$ - 105 out of 478 (22%) |
| $1400_{hex}$ - 22 out of 478 (5%) |
| $0310_{hex}$ - 22 out of 478 (5%) |
| $0308_{hex}$ - 16 out of 478 (3%) |
| $0080_{hex}$ - 15 out of 478 (3%) |
| $0040_{hex}$ - 12 out of 478 (3%) |
| $4400_{hex}$ - 10 out of 478 (2%) |
| $0008_{hex}$ - 9 out of 478 (2%) |
| $0010_{hex}$ - 8 out of 478 (2%) |
| others - (less than 2%) |

Using the results of Table one, a microstore in a data processor can be provided wherein the control field information is selectively forced to a most commonly used state of a given field whenever a control word is accessed. The control field information is forced to the most commonly used state when the field's contents are the most commonly used state as determined by the addition of an extra field added to a Next Microaddress ROM. The extra field within the NMA-ROM can be used by a programmed select circuit which outputs accurate programmed control field information in response to the NMA-ROM's extra field. Therefore, the actual contents of the field for the addressed word in the control ROM is irrelevant and can be changed to whatever state desired. Specifically, the contents of the field for that control word can be changed such that the control word is identical to other control words, thus dramatically increasing the control word sharing in a control ROM of a data processor. The present invention makes the contents of the shared particular fields essentially a "do not care" field for predetermined control words.

In one form, the shared control word fields are forced to a most commonly used state of a field programmed within a select circuit by adding one bit into an NMA-ROM for each field which is to be forced to a predetermined state (the most commonly used state). If this bit is asserted in the NMA-ROM by being addressed concurrently with the shared control ROM field, the output for that particular control ROM field of bits is forced by the select circuit to the most commonly used state, thus ignoring the actual contents of the field in that control word of the control ROM. Since these bits are ignored, they can take on whatever state is most optimum for allowing a predetermined control word to share with another control word. In another form of the present invention, for addresses where all fields of the control ROM are ignored, none of the outputted bits of a control word actually come from the control ROM.

In order to take full advantage of this concept, a further analysis of the ROM fields is required. It can be shown that the potential sharing can be increased if the control ROM fields are made more granular (i.e. the number of fields is increased, thus decreasing the number of bits in each field). The tradeoff of this approach is that more bits are required for the extra field in the NMA-ROM (one for each field in most instances). A precaution must be taken to insure that additional control ROM savings enjoyed as a result of the increased sharing is not offset by the extra silicon required to implement the extra bits in the NMA-ROM. Another possibility for increasing the potential share ratio is to have multiple forced values for a single given field. This is particularly useful if there is no particular bit pattern which is used in a majority of control words. As an example, in Table One, there is not a large difference in the frequency of occurrence between the first ($0000_{hex}$) and second ($0300_{hex}$) bit patterns. Therefore, this field is a candidate for having two forced values. Again, the tradeoff is that more microword bits are required in the NMA-ROM, thus reducing size savings gained in the control ROM.

Figure 3:
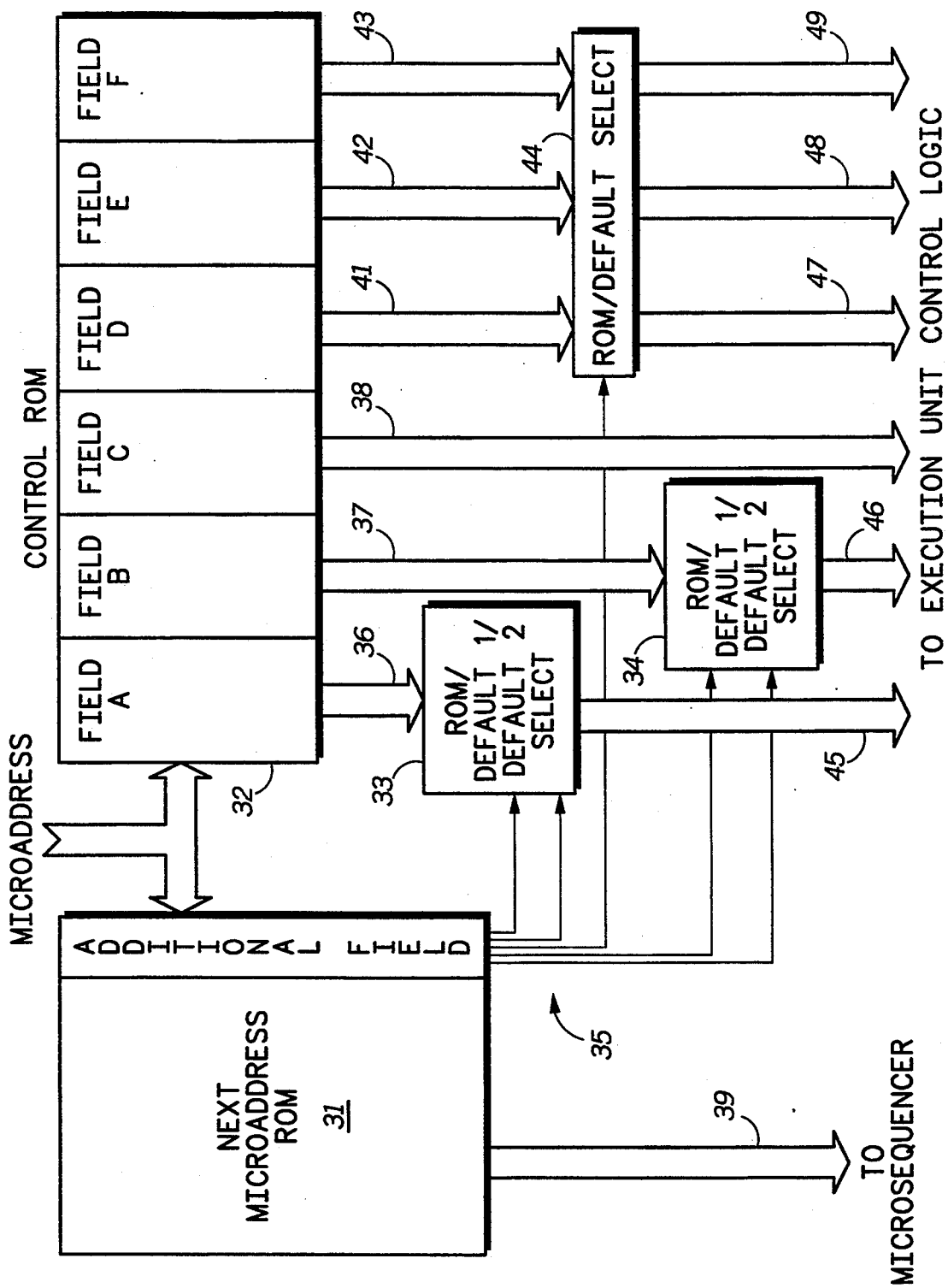
FIG. 3 is a block diagram depicting a data processor with split level microstore in accordance with the present invention.

Shown in FIG. 3 is a data processor microstore 25 which implements the invention as described above. Data processor microstore 25 generally comprises a Next Microaddress ROM 31, a control ROM 32 and programmable select circuits 33, 34 and 44. A microaddress is connected to both control ROM 32 and NMA-ROM 31. Control ROM 32 has a plurality of fields labeled from "A" thru "F". Next microaddress ROM 31 has fields for storing addresses and has an additional field of predetermined bit size. NMA-ROM 31 outputs a next microaddress to a microsequencer (not shown). In the illustrated form, Next Microaddress (NMA)-ROM 31 controls all three programmable select circuits 33, 34 and 44. Two control signals are connected from NMA-ROM 31 to each of programmable select circuits 33 and 34, and a single control signal is connected from NMA-ROM 31 to programmable select circuit 44. Programmable select circuits 33 and 34 are each labeled a "ROM/Default One/Default Two Select" circuit meaning that they selectively output either a received word from control ROM 32 or one of two programmed default values in response to the control signal connected thereto from NMA-ROM 31. Programmable select circuit 44 is labeled a "ROM/Default Select" circuit meaning that they selectively output either a received word from control ROM 32 or a programmed default value in response to the control signal connected thereto from NMA-ROM 31. Programmable select circuit 33 is connected to control ROM 32 via a ROM output 36, and programmable select circuit 34 is connected to control ROM 32 via a ROM output 37. Control ROM 32 also has an output 38 and outputs 41, 42 and 43 connected to programmable select circuit 44. Programmable select circuits 33 and 34 respectively have outputs 45 and 46, and programmable select circuit 44 has outputs 47, 48 and 49.

In the illustrated form, programmable select circuits 33 and 34 can respectively force a particular value for control ROM 32 field A and field B. Programmable select circuit 44 can force a particular value for fields D, E and F of control ROM 32. Of the five illustrated control signals 35 driven by NMA ROM 31, two signals are used to select output 45 for field A. These two control signals select either: (1) the normal ROM output 36; (2) a first default value which is program forced; or (3) a second default value which is also program forced. From the earlier shifter example of Table One, due to the repetitiveness the "default 1" value is $0000_{hex}$, the "default 2" value is $0300_{hex}$ and the field is fifteen bits long. It should be well understood that any particular bit sizes provided herein are given by way of illustration only and not as a limitation. Field B of control ROM 32 is controlled similarly to field A, wherein the default values are chosen optimally for field B. In the particular example, Field C does not utilize any sharing or compression (dynamic 'do not care' control information) as the control ROM 32's outputs of field C are used directly. Fields D, E and F of control ROM 32 are combined into an effective single field for selective 'do not caring' storage of control information, and selector 44 can select either all or some of the control ROM 32's outputs 41, 42 or 43 or force a default value for a portion of or all of the combined field. It should be noted some control ROM 32 signals or fields may have such tight timing constraints that dynamic 'do not care' requires specific design specifications.

As an example, it was found that the sharing method taught herein, by itself, reduced the control ROM 32 size by roughly seventeen percent. This figure is given by way of example only and better size improvements may be possible. When considering both the NMA-ROM 31 and control ROM 32, the reduction is equivalent to saving roughly thirteen percent of the total ROM. Using dynamic 'do not care' and sharing, the control ROM 32 size is reduced roughly twenty-seven percent and the NMA-ROM 31 size increased roughly fifteen percent, for a savings of roughly seventeen percent for the combined ROM.

By now it should be apparent that there has been provided a microcontrol store apparatus and method of use for a data processing system which reduces the size of the apparatus. By taking advantage of commonly repeated bit patterns in a ROM, a large amount of duplication in a data processor's ROM can be significantly reduced.

While the present invention has been shown and described with reference to a particular embodiment thereof, various modifications and changes thereto will be apparent to those skilled in the art and are within the spirit and scope of the present invention.

We claim:

1. A microprogrammed digital data processor having a plurality of control words with identical control information in microstorage, said data processor comprising:
   a microaddress bus;
   a control memory having address input means coupled to the microaddress bus for receiving a microaddress and having a plurality of multi-bit output means, each of which provides a multi-bit output in response to receiving the microaddress, the control memory having a plurality of predetermined field sections, the control member being reduced in size by having at least one of the field sections use a single shared storage location for a plurality of predetermined values of microaddresses;
   a next microaddress memory having address input means coupled to the microaddress bus for receiving the microaddress, a first output means for providing a next microaddress in response to receiving the microaddress and a second output for providing a selection control signal from an additional field in the next microaddress memory, the additional field being used to determined when one of the plurality of values of microaddresses not individually implemented in the control memory is addressed and generating the selection control signal in response thereto;

select means having a first input coupled to a first one of the plurality of multi-bit outputs of the control memory and a second input coupled to the second output of the next microaddress memory to receive the selection control signal and having an output, the select means storing a plurality of predetermined default values and outputting one of: (1) a value received from the first one of the plurality of multi-bit outputs of the control memory or (2) one of the predetermined default values, dependent on a value of the selection control signal received from the next microaddress memory; and an execution unit having a first input coupled to the output of the select means and a second input connected to one of the plurality of multi-bit outputs of the control memory.

2. A microprogrammed digital data processor according to claim 1 further comprising:

second select means having a first input coupled to a second one of the plurality of multi-bit outputs of the control memory and a second input coupled to the second output of the next microaddress memory to receive the selection control signal and having an output, the second select means is for outputting one of a value received from the second one of the plurality of multi-bit outputs of the control memory or a second predetermined value dependent on a value of the selection control signal received from the next microaddress memory; and the execution unit further comprises a third input connected to the output of the second select means.

3. A microprogrammed digital data processor according to claim 1 wherein the select means is further for outputting one of a value received from the first one of the plurality of multi-bit outputs of the control memory or one of plurality of predetermined values dependent on a value of the second output of the next microaddress memory.

* * * * *